United States Patent [19]

Begin et al.

[11] Patent Number: 5,406,200
[45] Date of Patent: Apr. 11, 1995

[54] METHOD AND APPARATUS FOR TEMPERATURE COMPENSATION OF MAGNETOSTRICTIVE POSITION DETECTION

[75] Inventors: John D. Begin; Richard D. Koski, both of Troy, Mich.

[73] Assignee: MagneTek Controls, Inc., Clawson, Mich.

[21] Appl. No.: 19,443

[22] Filed: Feb. 18, 1993

[51] Int. Cl.⁶ .................. G01B 7/14; G01F 23/30; G01R 35/00
[52] U.S. Cl. .................. 324/207.12; 324/207.13; 324/207.24; 73/290 V
[58] Field of Search ............. 324/207.12, 207.13, 324/207.22, 207.24; 364/571.01–571.05; 367/127, 902; 73/290 V, 314

[56] References Cited

U.S. PATENT DOCUMENTS

| | | | |
|---|---|---|---|
| 4,028,619 | 6/1977 | Edwards . | |
| 4,071,818 | 1/1978 | Krisst | 324/207.13 |
| 4,158,964 | 6/1979 | McCrea et al. | 73/290 R X |
| 4,238,844 | 12/1980 | Ueda et al. | 367/902 X |
| 4,305,283 | 12/1981 | Redding | 73/290 V |
| 5,017,867 | 5/1991 | Dumais et al. | 324/207.13 |
| 5,072,180 | 12/1991 | Moreau | 324/207.12 |
| 5,076,100 | 12/1991 | Hunter et al. | 73/290 V |
| 5,258,707 | 11/1993 | Begin et al. | 324/207.12 |
| 5,274,328 | 12/1993 | Begin et al. | 324/207.12 |

*Primary Examiner*—Walter E. Snow
*Assistant Examiner*—Jay M. Patidar
*Attorney, Agent, or Firm*—Krass & Young

[57] ABSTRACT

In a position detection probe having a magnetostrictive wire stretched between a head and a reflective foot end termination, and a magnet displaceable along the probe and using the sonic pulse propagation time from the magnet to the foot end termination as a position detection parameter, compensation for thermal expansion and thermal change of propagation velocity is made by measuring the wire resistance and calculating a compensation from the resistance. The probe is excited by an electrical pulse having a known current. The voltage across the wire is measured at a time when the current has stabilized to a precise value, and resistance is determined from the current and voltage.

12 Claims, 5 Drawing Sheets

METHOD AND APPARATUS FOR TEMPERATURE COMPENSATION OF MAGNETOSTRICTIVE POSITION DETECTION

FIELD OF THE INVENTION

This invention relates to a method and apparatus for measuring position by a magnetostrictive position detector and particularly to such a method and apparatus which compensates for all effects of temperature.

BACKGROUND OF THE INVENTION

The usefulness of the phenomenon of magnetostriction in linear distance or position measuring devices is well documented in the prior art. One improvement over the basic technology of particular interest is the increase in measurement resolution as set forth in the U.S. Pat. No. 5,017,867 to Dumais et al entitled "Magnetostrictive Linear Position Detector with Reflection Termination", which is incorporated herein by reference. According to that patent a magnetostrictive wire is stretched between a head and a reflective termination and a displaceable magnet is movably disposed along the wire in accordance with the position to be detected. The wire is excited by an electrical pulse which interacts with the field of the magnet to induce a torsional motion in the wire which propagates as sonic pulses in one direction directly to the head and in the opposite direction to the termination where is reflected to the head. A detector at the head senses the arrival times of the motions which are spaced in time according to the position of the magnet and the propagation velocity along the wire. The difference of the arrival times and the known length of the wire are used to calculate the position of the magnet. Alternatively, the wire is excited by a sonic pulse at the head and an electrical pulse is induced by the magnet when the mechanical pulse reaches the magnet directly and again upon reflection. The timing of the electrical pulses is used to calculate the magnet position in the same way as the electrical excitation type of detector.

The utilization of the entire wire length by the Dumais et al device leads not only to high resolution but also to a sensitivity to thermal changes in wire length. Thermal effects on magnetostrictive detectors and have been considered by others as indicated by the U.S. Pat. Nos. Hunter et al 5,076,100, Redding 4,305,283, McCrea et al 4,158,964, Ueda et al 4,238,844, Krist 4,071,818 and Edwards 4,028,619. Thus it is recognized that the propagation rate of a mechanical pulse in the wire varies with temperature and also that thermal expansion of the wire or the tube supporting the wire can affect measurement accuracy. Various schemes for obviating some of the thermal effects are proposed, including the use of the total propagation times of a mechanical pulse traveling directly between the position magnet and the head and a pulse reflected from an end termination to compensate for changes in propagation velocity. Compensation for changes in wire length is discussed, for example by Krist, but no viable compensation method is advanced. Ueda et al teach measuring the sum of the propagation times along the wire but expressly assume the wire length is constant, using the sum information only for compensation of propagation rate. McCrea et al utilize a bottom reference magnet in a tank to obtain information on wire length. The reference magnet is presumed to have a fixed position but actually the magnet moves relative to the bottom as wire length changes and there is no teaching of compensating for the wire length change. Redding teaches compensating for propagation velocity changes by using two reference magnets at a fixed spacing and a movable magnet between the reference magnets to obtain time ratios independent of the propagation velocity. Hunter et al uses thermistors to provide temperature measurements which are used to adjust distance measurements. Edwards discloses a magnetostrictive rod anchored at one end to provide a reflective termination and has a sonic pulse detector at the other end. The arrangement precludes any effect of thermal expansion on the position measurement, but thermal effects on propagation velocity are detected for compensation purposes by comparing the count representing the sum of direct and reflected pulse propagation times to a constant value.

While effective compensation for thermal changes of propagation rate has been provided in the prior art, until recently, there has been no effective compensation for thermal expansion of the wire. For the type of high resolution detector employed in this invention, the thermal expansion gives rise to larger errors than the change in propagation rate. For Nispan C magnetostrictive wire, the thermal expansion is 5 ppm/° C. while the propagation velocity change is only 3 ppm/° C. While both effects are significant and must be taken into account where precision measurements are required, the thermal expansion is especially important. Ideally, all thermal effects should be compensated for. A U.S. patent application S N. 07/915,516, now U.S. Pat. No. 5,274,328, "Temperature Compensation for Magnetostrictive Position Detector", assigned to the assignee of this invention, sets forth a method for determining a temperature related parameter and making the necessary corrections. The present invention relies on a fundamentally different approach to temperature determination and uses compensation calculations similar to the previous application for making the corrections.

SUMMARY OF THE INVENTION

It is therefore an object of the invention to provide a method and apparatus for complete thermal compensation of position detectors, and including the ability to compensate for thermal changes in length.

The invention is carried out by a magnetostrictive linear position detector having a magnetostrictive wire stretched between a fixed head and a termination wherein the wire length and the position of the termination is dependent on temperature, a magnet movable along the wire, means for inducing sonic pulses in the wire traversing the distance between the head and the magnet, means for measuring the pulse propagation time, means for measuring the wire resistance which is a function of temperature, and circuit means responsive to the measured propagation time and the resistance for determining the position of the magnet.

The invention is also carried out in the apparatus by the method of measuring the magnet position and compensating for the effects of temperature changes by measuring wire resistance which is a function of the temperature, measuring propagation time, and calculating the magnet position from the resistance and the propagation time.

The invention applies to apparatus which uses a reflective termination and measures the propagation time that is the time difference of direct pulse propagation and reflected pulse propagation, as well as apparatus which uses simply the direct propagation time measurement. In either case, sonic pulses are induced at the magnet position by exciting the wire with a current pulse of sufficient width to stabilize at a known current. Interaction of the current pulse and the field of the magnet produces a sonic pulse in the wire. Near the end of the pulse when it is at a stabilized current value, the voltage is measured. The voltage, then, becomes a measure of resistance and is effectively a measure of temperature as well. Thus sufficient data is gathered to calculate the magnet position along the wire with correction for temperature effects on propagation velocity and wire length. The wire length is of special concern for the mode using the reflective termination and the time difference of propagation.

BRIEF DESCRIPTION OF THE DRAWINGS

The above and other advantages of the invention will become more apparent from the following description taken in conjunction with the accompanying drawings wherein like references refer to like parts and wherein.

DESCRIPTION OF THE INVENTION

Figure 1:
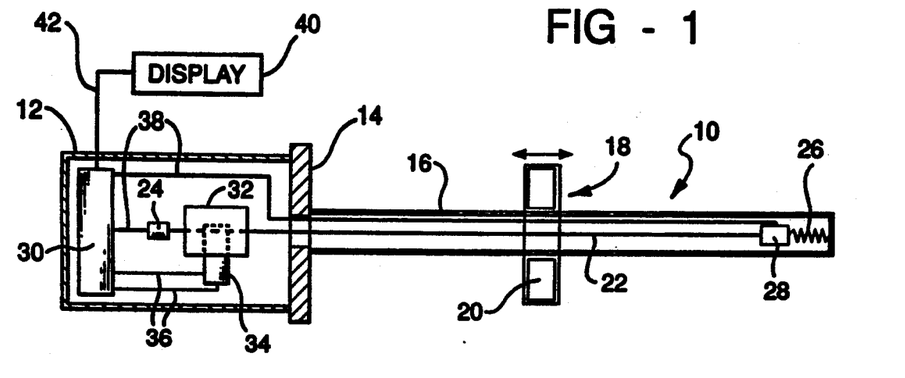
FIG. 1 is a cross-sectional view of a magnetostrictive probe used in carrying out the invention.

Referring to FIG. 1, a schematic diagram of a magnetostrictive linear position detector 10 shows a head 12 mounted on a base 14 and a tube 16 extending from the base, and a sliding collar 18 movably mounted on the tube 16 and containing a permanent magnet assembly 20, hereafter called a magnet 20. A magnetostrictive wire 22 preferably made of a nickel/iron alloy such as Nispan C is stretched along the center of the tube 16 and is held in the head at an anchor 24 which does not reflect sonic pulses in the wire. The Wire 22 is held at its foot end in the end of the tube 16 by a spring 26 which applies a constant tension on the wire. A reflection collar 28 is secured to the wire 22 at the foot end and comprises a torus formed of a non-magnetic material such as brass and has a bore receiving the wire and a set screw to clamp the wire to the collar. The reflection collar 28 provides a mass discontinuity on the wire 22 which serves to reflect a sonic pulse arriving at the foot end of the wire back toward the head end.

The head 12 contains a Signal processing circuit 30 and a transducer 32 which is well known in the art for sensing the arrival of a sonic pulse. The transducer 32 comprises a piezoelectric crystal 34 engaging the wire 22 and a pair of silicone rubber pads (not shown) engaging either side of the wire 22 and crystal 34. Electrodes on the crystal 34 are connected by leads 36 to the circuit 30. Torsional movement of the wire imparts a strain to the crystal 34 which produces a corresponding voltage pulse on the leads 36. Conversely, if a voltage is imposed on the crystal 34 by the leads 36 the crystal will impart a torsional pulse to the wire 22. The circuit 30 is connected by leads 38 to the head end and the foot end of the wire 22 to either impart an electrical pulse to the wire or to detect an electrical pulse in the wire. An external display 40 for showing measurement results is connected to the circuit 30 by a line 42.

Figure 2:
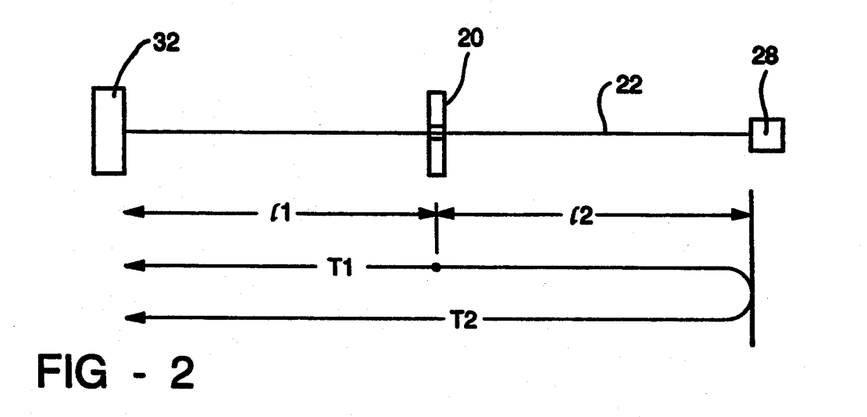
FIG. 2 is a diagram illustrating propagation times of sonic pulses in the probe of FIG. 1.

In general the probe 10 operates in either of two modes. In the first mode the probe is excited by applying an electrical pulse from the circuit 30 to the wire 22 and the field of the magnet 20 interacting with the electrical pulse causes a torsional motion in the wire. That torsional motion, herein called a sonic pulse, propagates in both directions along the wire at a temperature dependent velocity so that the one pulse reaches the transducer directly and a second pulse is first reflected from the collar 28 and then reaches the transducer, so that the transducer 32 produces two electrical pulses separated by a time interval. As illustrated in the schematic drawing of FIG. 2, the first pulse arrives at the head a time interval T1 after it is initiated, the time interval being proportional to the distance $l_1$ between the magnet 20 and the transducer 32. The second pulse arrives at the head a time interval T2 after initiation which is proportional to the distance $2l_2 + l_1$, where $l_2$ is the distance between the magnet 20 and the reflective collar 28. The times T1 and T2 are processed by the circuit 30 to determine the position of the magnet. In the second mode of operation the probe is excited by energizing the transducer to apply a torsional motion to the head end of the wire 22 and the resultant sonic pulse travels to the magnet 20 first in a direct path and second after reflection from the collar 28. Each time the sonic pulse reaches the magnet an electrical pulse is induced in the wire 22 due to interaction with the magnetic field of the magnet. This results in two pulses reaching the circuit 30 via the leads 38 at time intervals T1 and T2 which are the same as those described above. Additional details on the construction and operation of such a transducer and the probe as a whole are given in the aforesaid U.S. Pat. No. 5,017,867 to Dumais et al. The circuit 30, however is different from that described in the patent.

Figure 1A:
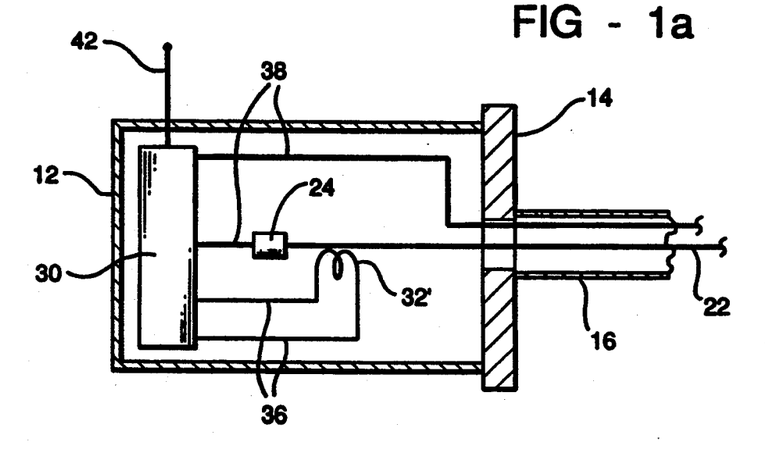
FIG. 1a is a partial view of a probe showing an alternative structure to the FIG. 1 probe.

FIG. 1a depicts an alternative probe which is the same as the probe of FIG. 1 except that a transducer coil 32' is used in place of the transducer 32. The coil 32' is sensitive to a magnetic pulse which accompanies the sonic pulse to produce an electrical pulse on lines 36 when a sonic pulse reaches the transducer location in the head. Thus the function of detecting a sonic pulse is equivalent to that of the transducer 32. However, the transducer coil 32' operates only in the first mode as described above.

Figure 3:
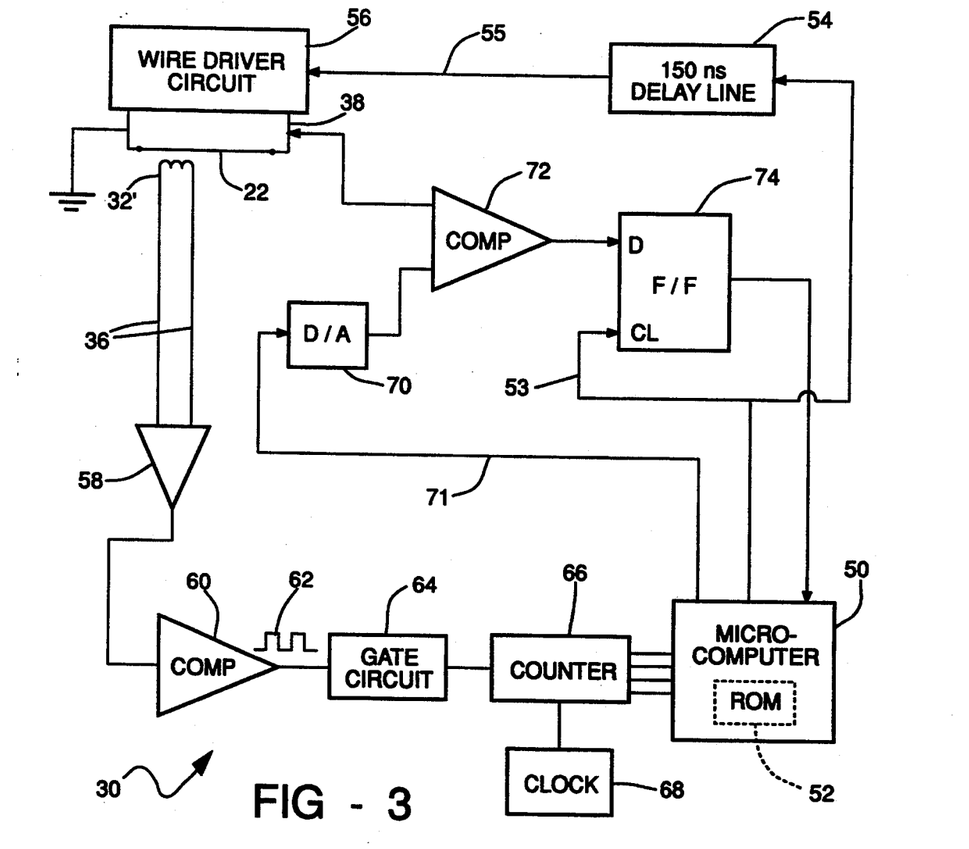
FIG. 3 is a schematic circuit diagram of the circuit of the probe of FIG. 1.

The circuit 30, as shown in FIG. 3, is configured to register time interval T2-T1 and measure the resistance of the wire 22. The circuit 30 is based on a microcomputer 50 including a ROM 52 and which has output line 53 to a 150 nsec delay line 54 which is connected by a line 55 to a driver circuit 56. The driver circuit is coupled via lines 38 to the wire 22 to supply periodic electrical excitation pulses to the wire when commanded by the computer 50, one of the lines 38 being grounded. The transducer coil 32' (or transducer 32) which senses sonic pulses in the wire is coupled by the leads 36 to an amplifier 58 which feeds a comparator 60. The comparator issues return pulses 62 when the sonic pulses arrive at the head and produce signals which, when amplified, exceed a threshold set in the comparator. The comparator 60 output is coupled to the inputs of a gate circuit 64. A counter 66 is coupled to a high speed clock 68 and is controlled by the gate circuit 64. The counter has digital outputs fed to the computer 50.

In operation, the computer 50 issues a series of trigger pulses to the driver 56, the pulses being spaced sufficiently to allow cessation of the sonic pulses in the wire resulting from an excitation pulse before applying the next excitation pulse. The two pulses 62 corresponding to the time T1 when the direct pulse reaches the head and the time T2 when the reflected pulse reaches the head cause the gate circuit 64 to start and stop, respectively, causing the counter 66 to count the clock pulses during the period between the receipt of the T1 pulse and the T2 pulse, so that the final counter content will be proportional to the difference T2-T1. Temperature measurement is made by the circuit 30 which includes a digital to analog converter (D/A) 70 having its input connected by line 71 to the microcomputer 50, a comparator 72 having one input connected to the analog output of the D/A 70 and another input connected to the ungrounded line 38. A flip/flop 74 has its data input coupled to the output of the comparator 72, its clock input connected by the line 53 to the microcomputer, and its output also connected to the computer.

Figure 3A:
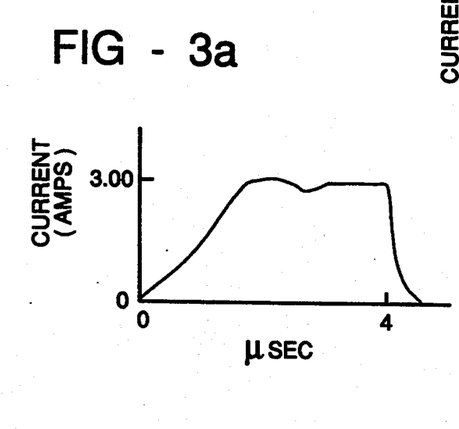
FIGS. 3a and 3b are waveforms of current pulses used to excite the probe.
Figure 3B:
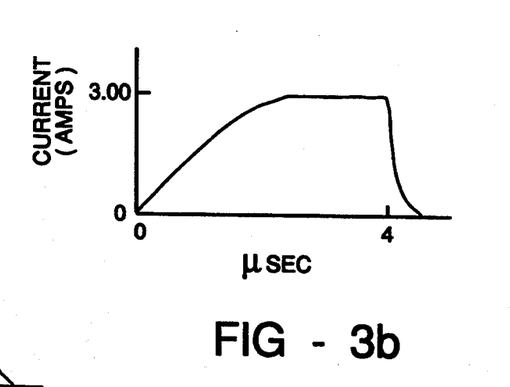

The wire driver circuit is constructed to supply to the wire 22 an excitation pulse of precise amperage, preferably, 3.00 amps. The pulse shape depends on the length of the wire due to the wire reactance. As shown in FIG. 3a, for a short wire, the pulse current rapidly reaches its desired value, but initially experiences some transients. For a long wire 22, as shown in FIG. 3b, the current increases slowly to its desired value. In either case the current settles to a steady state of precise value before the end of the pulse. A pulse width of 4 microseconds has been found to be sufficient to attain stable current near the end of the pulse. It is at that time that a voltage measurement should be made.

In operation, the microcomputer 50 initially applies an input to the D/A 70 which yields a reference voltage at the nominal wire voltage, which is, for example, on the order of 10 volts. The microcomputer also applies to the wire driver circuit, over lines 53, 54, and 55, a signal to start and stop the current pulse. Due to the delay line 54, the clock signal is applied to the flip/flop an instant before the end of the pulse is signaled to the driver circuit 56. The comparator 72 compares the D/A reference voltage with the measured wire 22 voltage to produce a high or low output to the flip-flop 74, depending on which input voltage is higher When the clock signal is issued, the flip/flop passes its input to the microcomputer. Depending whether that flip/flop input is high or low, the microcomputer adjusts the digital input to the D/A 70 in a direction to equalize the two voltages. After a few pulses the two voltages will be nearly balanced and the digital input will correspond to the wire voltage. Since for a given current the voltage is proportional to wire resistance, the digital input value is representative of resistance and is a measure of the wire temperature.

By calibrating the wire to determine parameters defining its thermal characteristics, temperature compensation can be accomplished and all thermal effects including changes in propagation velocity and wire length will be comprehended. Results of calibration are stored in the ROM 52 of the computer 50 and subsequent position calculations are made by the computer using the calibration data.

Figure 4:
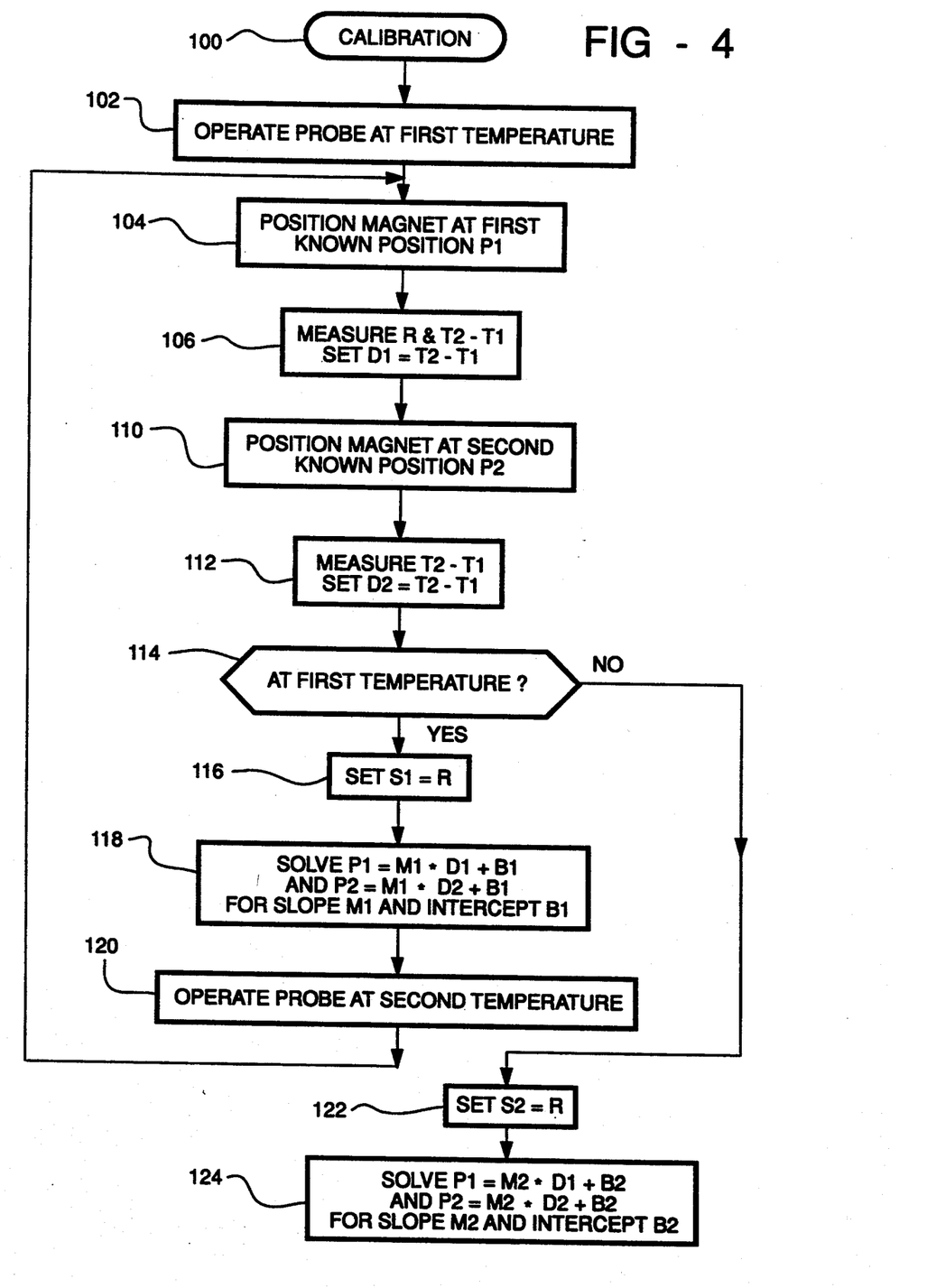
FIGS. 4 through 7 are flow charts illustrating the methods of carrying out the invention.

The calibration scheme assumes that the system is linear; that is, the thermal effects on position measurement are proportional to temperature changes and the propagation rate in the wire is uniform so that changes in the measured time interval are proportional to magnet displacement. Such a system can be defined by a linear equation $P = M*D + B$ where P is the magnet position relative to some fixed reference such as the head end of the wire, M is a temperature dependent slope to be determined by calibration, D is the propagation time difference T2-T1, and B is a temperature dependent intercept also determined by calibration. The calibration is carried out at a first temperature (say, about 25° C.) by positioning the magnet accurately at two different known positions and making measurements of the resistance R and the time difference D=T2-T1, repeating the measurements at another temperature (say, about 80°), and solving the linear equation for each temperature. The temperature is always identified by the parameter R. The flow chart of FIG. 4 details the calibration procedure. In this and other flow charts references to tasks which have been detailed in flow diagram function blocks are designated by <nn>, where nn is the block reference number. The calibration process 100 includes operating the probe at a first temperature <102>, positioning the magnet at a first known position P1 <104>, energizing the probe to measure R and T2-T1 and set D1 =T2-T1 <106>, position the magnet 22 at a second known position P2 <110>, measure T2-T1 and set D2 equal to T2-T1 <112>; since the probe is at the first temperature <114> S1 is set equal to R <116> and the linear equations are solved for the slope M1 and the intercept B1 <118>. Next, the probe is operated at a second temperature <120> and the steps 104–112 are repeated; since the probe is at the second temperature <114>, S2 is set equal to R <122>, and finally the linear equations are solved for the slope M2 and the intercept B2. Thus for each of the two temperatures S1 and S2 both the slope and intercept are determined.

Figure 5:
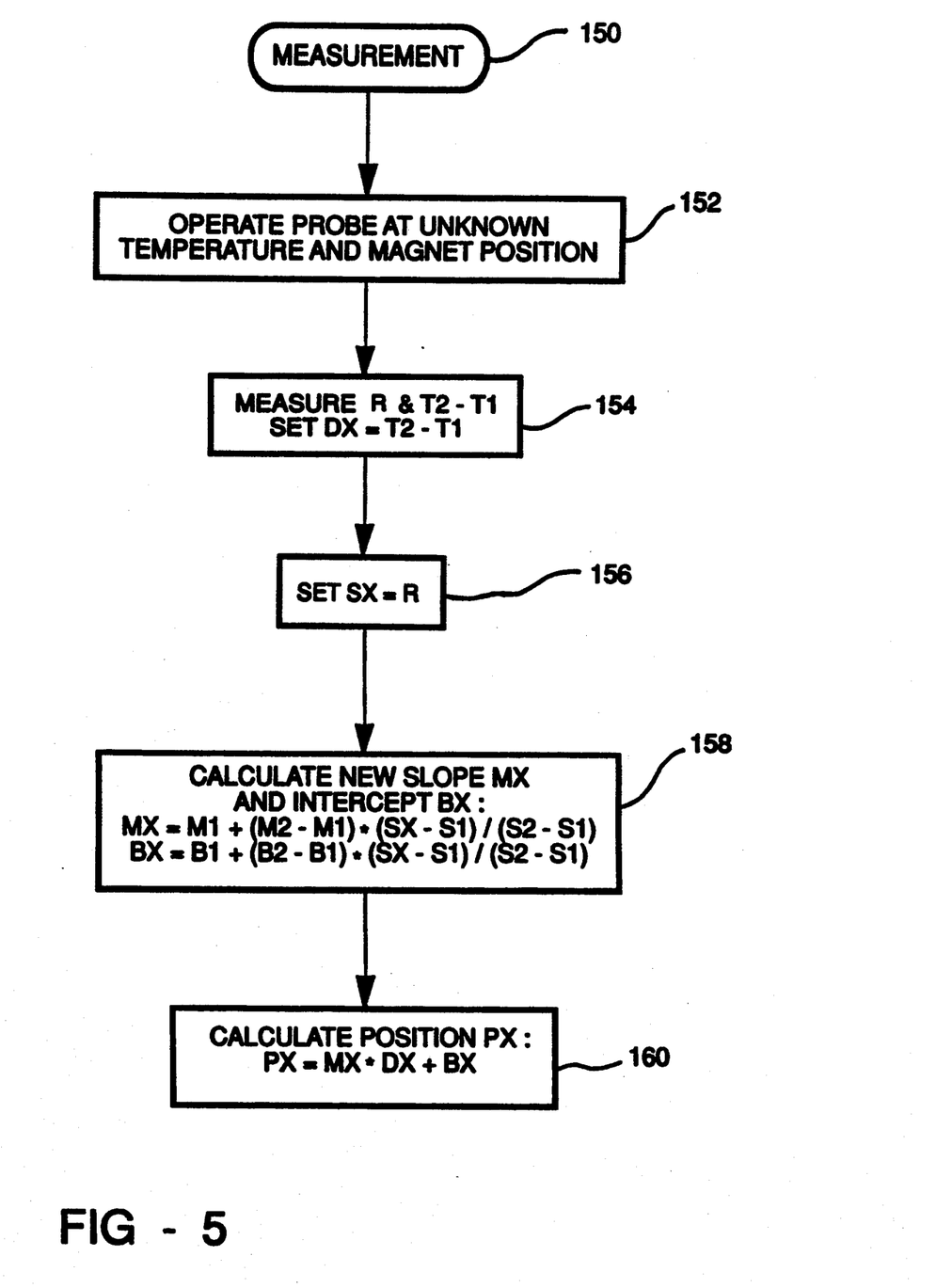

Once the probe has been calibrated it can be used to measure the magnet position at an unknown temperature. New slope and intercept values for the new temperature must be determined by interpolation. As shown in the flow chart of FIG. 5 the measurement method 150 comprises operating the probe at some magnet position <152>, measuring R and T2-T1 and setting the difference Dx equal to T2-T1 <154>, setting the sum Sx equal to R <156>, calculating the new slope Mx and intercept Bx for the present temperature, Sx, from the interpolating equations $$Mx = M1 + (M2 - M1)*(Sx - S1)/(S2 - S1)$$

and $$Bx = B1 + (B2 - B1)*(Sx - S1)/(S2 - S1) < 158>,$$

and finally calculating the magnet position from $Px = Mx*Dx + Bx < 160>$.

Figure 6:
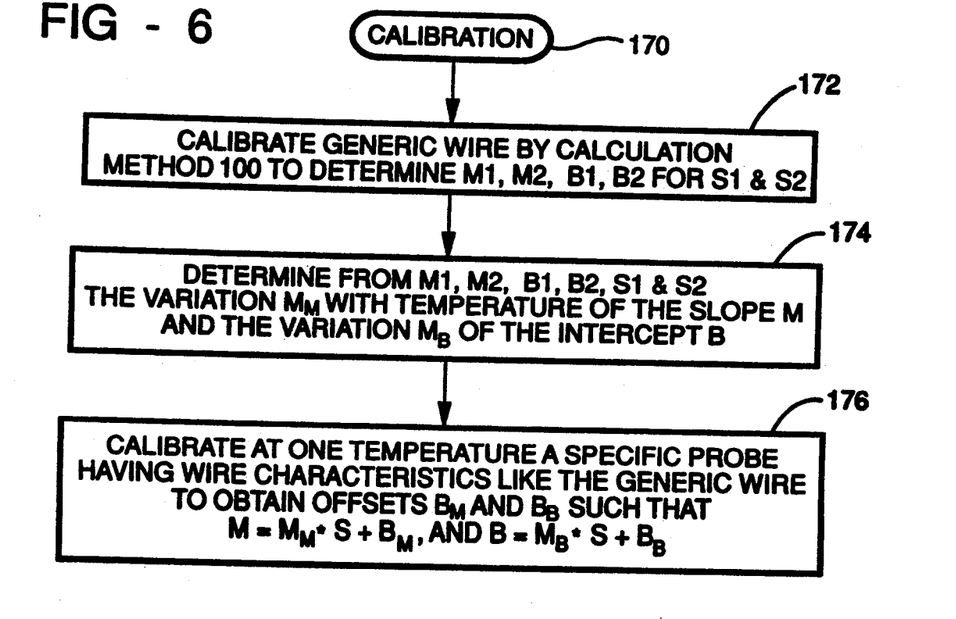

Another calibration method for linear probes which is less expensive for building a large number of probes using wires having the same thermal characteristics defines the general equations for the wire slope M and intercept B such that $M = M_M*S + B_M$ and $B = M_B*s + B_B$. This method entails determining the temperature dependent wire characteristics $M_M$ and $M_B$ by empirical methods applied to data from one calibrated wire or to a history of data accumulated from a number of similar wires, and then finally calibrating each individual probe at only one temperature to establish offsets $B_M$ and $B_B$ which are peculiar to a specific probe. The resulting equations allow easy calculation of subsequent position measurements. The flow chart of FIG. 6 shows the calibration method 170 which first determines for two temperatures S1 and S2 the wire characteristic parameters M1, M2, B1 and B2 by the calibration method 100, for example <172>. Then the variation $M_M$ with temperature of the slope M and the variation $M_B$ of the intercept B are calculated from the wire characteristic parameters <174>, and then each individual probe is calibrated at one temperature to obtain the offsets $B_M$ and $B_B$ <176>.

Figure 7:
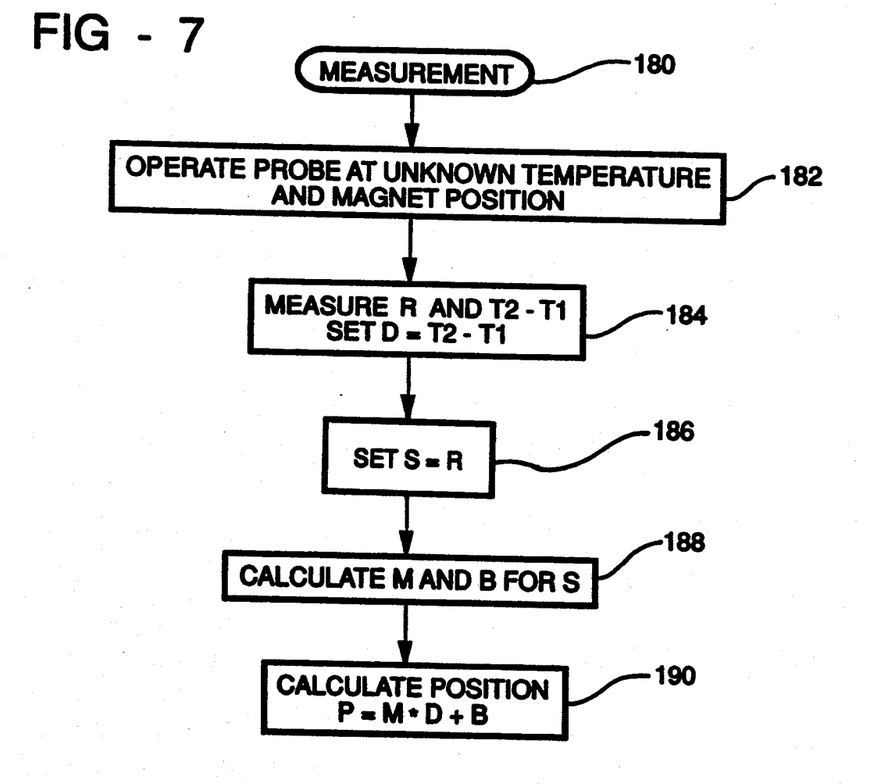

Given the equations for M and B provided by the calibration method 170, measurements by a probe are easily made. As set out by the flow chart of FIG. 7, the measurement method 180 comprises operating the probe at some magnet position <182>, measuring R and T2-T1 and setting D equal to T2-T1 <184>, setting R equal to S <186>, calculating M and B for the present value of S from the equations determined during the calibration <188>, and finally calculating magnet position as $P = M*D + B$ <190>.

While the description has been directed to practice of the invention with a probe having a reflective termination and the measurement of the difference in propagation times of direct and reflected pulses, it applies as well to probes which measure only the propagation time of the direct pulse. It has been recognized that such devices are subject to temperature errors, especially due to the effect of temperature on propagation velocity. This invention allows the compensation for temperature using the same manner of measuring the voltage of the excitation pulse and using that to compensate for temperature. The temperature calibration is carried out in the same way and the calculations described above are used for calibration and measurement. One possible simplification occurs when the head is chosen as the measurement reference point: the offsets B, $B_M$ and $B_B$ are zero so that only the gains are temperature dependent.

Thus by adding a small amount of hardware to a conventional system, and by suitably programming the system microcomputer, temperature compensation can be achieved in a linear magnetostrictive position detector. The electrical excitation pulse is used not only for imparting a sonic pulse in the wire but also for resistance measurement.

The embodiments of the invention in which an exclusive property or privilege is claimed are defined as follows:

1. In a linear magnetostrictive position detector having a magnetostrictive wire stretched between a fixed head and a termination, a magnet movable along the wire, means for inducing sonic pulses in the wire traversing between the head and the magnet and having a propagation time dependent on the magnet position and temperature, means for measuring pulse propagation time, and circuit means responsive to the measured pulse propagation time for determining the position of the magnet; the method of measuring the magnet position and compensating for the effects of temperature changes comprising the steps of:
   exciting the wire with a current pulse to induce a sonic pulse;
   measuring the sonic pulse propagation time;
   measuring the resistance of the wire by using the current pulse wherein the resistance is a function of temperature; and
   calculating the magnet position from the resistance and the propagation time.

2. The invention as defined in claim 1 wherein the resistance is measured by the steps of:
   exciting the wire with a current of known value; and
   measuring the voltage induced across the wire, wherein the voltage is a measure of resistance.

3. The invention as defined in claim 1 wherein:
   the exciting step includes producing a current pulse of known value in the wire; and
   the resistance is measured by measuring the voltage induced across the wire by the current pulse.

4. The invention as defined in claim 1 wherein:
   the step of exciting the wire comprises applying a current pulse to the wire such that the current initially has a variable value and then attains a fixed value near the end of the pulse; and
   the step of measuring the resistance of the wire comprises measuring the voltage across the wire near the end of the pulse when the current has a fixed value.

5. The invention as defined in claim 1 wherein the magnet position P is determined by the equation $P = M*D + B$, where M and B are a gain and an offset, respectively, which are functions of temperature, and D is the measured propagation time, the method including the step of:
   calibrating the detector to determine the gain M and the offset B as a function of resistance;
   wherein the step of calculating the magnet position comprises solving said equation.

6. In a linear magnetostrictive position detector having a magnetostrictive wire stretched between a fixed head and a reflection termination wherein the wire length and the position of the termination is dependent on temperature, a magnet movable along the wire, means for inducing sonic pulses in the wire traversing the direct distance between the head and the magnet over a first propagation time and the indirect distance between the head and the magnet via reflection at the foot end over a second propagation time, means for measuring the propagation times of the sonic pulses, and circuit means responsive to the measured propagation times of the pulses for determining the position of the magnet; the method of measuring the magnet position and compensating for the effects of temperature changes comprising the steps of:
   exciting the wire with a current pulse to induce a sonic pulse;
   measuring the first and second propagation times of the sonic pulse;
   measuring the resistance of the wire using the current pulse; and
   calculating the magnet position from the resistance and the propagation times.

7. The invention as defined in claim 6 wherein the wire is excited by a current pulse, and the step of measuring the resistance of the wire includes;
   establishing the pulse current value; and
   measuring the voltage across the wire at the established current value; and
   determining the resistance from the measured voltage and the current value.

8. The invention as defined in claim 6 wherein:
   the exciting step comprises exciting the wire by a current pulse having a preset current value: and the step of measuring the resistance of the wire includes measuring the voltage across the wire at the preset current value during the current pulse.

9. A linear magnetostrictive position detector having a magnetostrictive wire stretched between a fixed head and a termination, a magnet movable along the wire, and a control circuit, wherein sonic pulses induced in the wire traversing from the magnet to the head have a propagation time dependent on the magnet position and the wire temperature; the control circuit comprising:

a microcomputer for calculating magnet position from information on temperature and propagation time;

means controlled by the microcomputer for electrically exciting the wire with a current pulse to induce a sonic pulse;

means for measuring pulse propagation time and inputting the time measurement to the microcomputer; and means for measuring the resistance of the wire using the current pulse wherein the resistance is a function of temperature, so that the resistance measure is available to the microcomputer;

whereby the microcomputer calculates magnet position compensated for temperature effects.

10. The invention as defined in claim 9 wherein;

the means for electrically exciting the wire comprises a wire driving circuit for applying a current pulse to the wire, the current having a preset value near the end of the pulse; and the means for measuring the resistance of the wire comprises a circuit for measuring the voltage across the wire when the current is at its preset value, the voltage being a function of the resistance and thus of the temperature.

11. The invention as defined in claim 9 wherein;

the means for electrically exciting the wire comprises a circuit for applying a preset current pulse to the wire, the pulse terminating at a time determined by the computer; and the means for measuring the resistance of the wire comprises a circuit controlled by the microcomputer for measuring the voltage across the wire just prior to the pulse termination time, the voltage being a function of the resistance and thus of the temperature.

12. The invention as defined in claim 9 wherein;

the means for electrically exciting the wire comprises a wire driving circuit for applying a current pulse to the wire, the current having a preset value; and the means for measuring the resistance of the wire comprises a circuit for measuring the voltage across the wire, and microcomputer controlled means for generating a reference voltage, comparing the measured voltage and the reference voltage, and adjusting the reference voltage to approximate the measured voltage, the voltage being a function of the resistance and thus of the temperature.

* * * * *